(12) United States Patent
Machida et al.

(10) Patent No.: US 6,974,010 B2
(45) Date of Patent: Dec. 13, 2005

(54) CLUTCH MECHANISM

(75) Inventors: Toshio Machida, Toyota (JP); Tomohiro Nozawa, Tochigi-ken (JP)

(73) Assignees: Aisin Seiki Kabushiki Kaisha, Kariya (JP); Daiichi Kasei Co., Ltd., Tochigi-Ken (JP)

(*) Notice: Subject to any disclaimer, the term of this patent is extended or adjusted under 35 U.S.C. 154(b) by 29 days.

(21) Appl. No.: 10/695,878

(22) Filed: Oct. 30, 2003

(65) Prior Publication Data

US 2004/0134737 A1 Jul. 15, 2004

(30) Foreign Application Priority Data

Oct. 30, 2002 (JP) .................................. 2002-316416
Oct. 30, 2002 (JP) .................................. 2002-316417

(51) Int. Cl.[7] .......................... E05B 65/20; E05B 47/00
(52) U.S. Cl. .............................. 192/17 D; 192/12 BA; 192/41 S
(58) Field of Search ............................ 192/15, 17 R, 192/17 D, 12 B, 12 BA, 41 S, 18 D

(56) References Cited

U.S. PATENT DOCUMENTS

| 1,674,009 | A | * | 6/1928 | Holmes ..................... 192/41 S |
| 2,484,185 | A | * | 10/1949 | Pepper ...................... 192/56.2 |
| 3,637,056 | A | | 1/1972 | Baer |
| 5,566,424 | A | * | 10/1996 | Crompton et al. ............. 16/342 |
| 6,095,312 | A | * | 8/2000 | Schumann ............... 192/223.4 |
| 6,138,808 | A | | 10/2000 | Wussow |

FOREIGN PATENT DOCUMENTS

| DE | 2105700 | 10/1971 |
| DE | 2133874 | 1/1972 |
| DE | 2941296 A1 | 5/1980 |
| DE | 19906043 A1 | 8/1999 |
| GB | 2034830 A | 6/1980 |
| JP | 2001-37155 | 2/2001 |

OTHER PUBLICATIONS

English translation of German Official Letter dated May 25, 2005.

* cited by examiner

*Primary Examiner*—Saul Rodriguez
(74) *Attorney, Agent, or Firm*—Buchanan Ingersoll PC

(57) ABSTRACT

A clutch mechanism includes rotation operating unit for rotating a second rotational member integrally with a first rotational member, the rotation operating unit includes a collar member installed near the second end of the operating spring, and at least one braking member rotatably disposed generating biasing force containing an element in a radial direction relative to a circumferential slidable contact surface of the collar member. The braking member includes an engaging portion configured to engage the second edge of the operating spring therewith.

21 Claims, 10 Drawing Sheets

CLUTCH MECHANISM

This application is based on and claims priority under 35 U.S.C. §119 with respect to Japanese Patent Application 2002-316416 filed on Oct. 30, 2002, and Japanese Patent Application 2002-316417 filed on Oct. 30, 2002, the entire contents of which are incorporated herein by reference.

FIELD OF THE INVENTION

This invention generally relates to a clutch mechanism having means for rotating a second rotational member together with a first rotational member by an operating spring which can tighten the first and second rotational members together.

BACKGROUND OF THE INVENTION

A known clutch mechanism related to the field of the invention has been disclosed in Japanese Patent Laid-Open Publication published No. 2001-37155. Especially as described in columns 0066 and 0067 and as illustrated in FIGS. 2 and 9, the clutch mechanism includes an input gear driven for rotation by a driving motor as a driving power source. The clutch mechanism further includes means for operating rotation such as a bushing and a coil. The bushing is engaged with an engaging portion (a second end) of a clutch spring as an operating spring. The coil acts as an electromagnet for attracting a clutch disc to a rotor rotatable together with the input gear by electromagnetic attracting force generated based upon electric current supply. The rotor is engaged with a first end of the clutch spring.

When the electromagnetic attracting force is generated to the coil, the bushing starts rotating together with the rotor and the clutch spring tightens an output hub as a second rotational member. In this case, the output hub is connected to an input hub as a first rotational member integrated with the rotor.

As described, the above-disclosed clutch mechanism includes the coil as the rotation operating means such that the electromagnetic attracting force can be generated by the coil supplied with electric current. In this case, a switching mechanism is required for switching electric current supply to the coil. This may bring a problem of difficulty in downsizing the clutch mechanism and saving weight thereof. Further, this may bring another problem that an actuator installed with the clutch mechanism may be relatively roughly assembled.

A need thus exists for providing an improved clutch mechanism which is more compact and more weight-saved such that the clutch mechanism can be more easily assembled.

Further, in the likely event such as faulty wiring of the driving motor when being assembled, the rotor (the first rotational member) and the busing may rotate in a revere rotational direction relative to a normal rotational direction. In this case, the engaging portion (the second end) of the clutch spring may move relative to the first end thereof in a direction to wind back the clutch spring—i.e., in a direction to expand an inner diameter of the clutch spring, in which the clutch spring may be broken, especially the vicinity of the second end thereof.

A need thus exists for providing an improved clutch mechanism, in which the operating spring may not be easily broken even when the first rotational member rotates in the reverse direction.

SUMMARY OF THE INVENTION

According to an aspect of the present invention, a clutch mechanism including a first rotational member supported to be rotated by a driving force from a driving power source, a rotatably supported second rotational member coaxially positioned with respect to the first rotational member, an operating spring extending along a peripheral surface of the first rotational member and a peripheral surface of the second rotational member, the operating spring having a first end and a second end, with the first end attached to the first rotational member so that the first end of the spring rotates with the first rotational member, and means for restraining rotation of the second end of the operating spring during rotation of the first rotational member in one direction so that during rotation of the first rotational member in the first direction the diameter of the operating spring is reduced to cause the operating spring to engage the peripheral surface of the second rotational member so that the first and second rotational members rotate together.

It is preferable that the means for restraining rotation of the second end of the operating spring during rotation of the first rotational member in the one direction comprises at least one braking member (16a, 16b) having an engaging portion engageable with the second end (10c) of the operating spring.

It is preferable that the clutch mechanism further includes a collar member installed towards the second end of the operating spring, the at least one braking member being rotatably disposed at the collar member and generating a radially directed biasing force relative to a circumferential contact surface of the collar member.

It is preferable that the contact surface of the collar member is an inner peripheral surface of the collar member, and the at least one braking member is disposed in the collar member in contact with the inner peripheral surface of the collar member and exerts the biasing force in a radially outward direction relative to the inner peripheral surface of the collar member.

It is preferable that the second end of the operating spring is provided with an approximately half-circle shaped engaged portion extending in a radially outward direction, and the engaging portion of the at least one braking member being formed as a bent end portion of the at least one braking member which is adapted to be received in the engaged portion of the operating spring. Upon rotation of the first rotational member in one direction, the engaged portion of the operating spring applies a force to the engaging portion of the at least one braking member which pulls the at least one braking member away from the contact surface of the collar member.

It is preferable that the at least one braking member comprises a C-shaped spring. The first and second C-shaped springs each have an engaging portion adapted to engage the second end of the operating spring, the engaging portion of the first C-shaped spring and the engaging portion of the second C-shaped spring is provided at the same side of the engaging portion of the second C-shaped spring in a circumferential direction of the spring.

It is preferable that the clutch mechanism further includes linking means for linking the first and second C-shaped springs to restrain relative movement between the first and second C-shaped springs in a circumferential direction.

It is preferable that the clutch mechanism further includes means for holding the operating spring to be coaxial with the first rotational member and the second rotational member prior to application of the driving force from the driving power source.

It is preferable that the clutch mechanism further includes a restraining member for restraining relative movement between the first end of the operating spring and the second end of the operating spring upon rotation of the first rotational member in a direction opposite the one direction.

It is preferable that the operating spring includes a cylindrical main body and a radially outwardly extending engaged portion at the second end of the operating spring. The first rotational member includes a guiding member housing the cylindrical main body of the operating spring. The restraining member comes in contact with the engaged portion of the operating spring upon rotational movement of the first rotational member in a direction opposite the one direction.

It is preferable that the first rotational member further includes an attaching portion for attaching the first end of the operating spring to the first rotational member. The guiding member includes a guiding groove extending towards the attaching portion to permit the first end of the operating spring to be moved towards the attaching portion.

It is preferable that at least a portion of the guiding groove (6S) possesses a tapering shape narrowing towards the attaching portion.

It is preferable that the guiding groove is a tapering slit which becomes more narrow towards the attaching portion. The guiding groove also possesses a bottleneck portion between an end of the slit and the attaching portion, the bottleneck portion having a dimension smaller than an outer diameter of the first end of the operating spring.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

The following description will be given for explaining a structure of an actuator for releasing a latch from an engaged condition.

Figure 1:
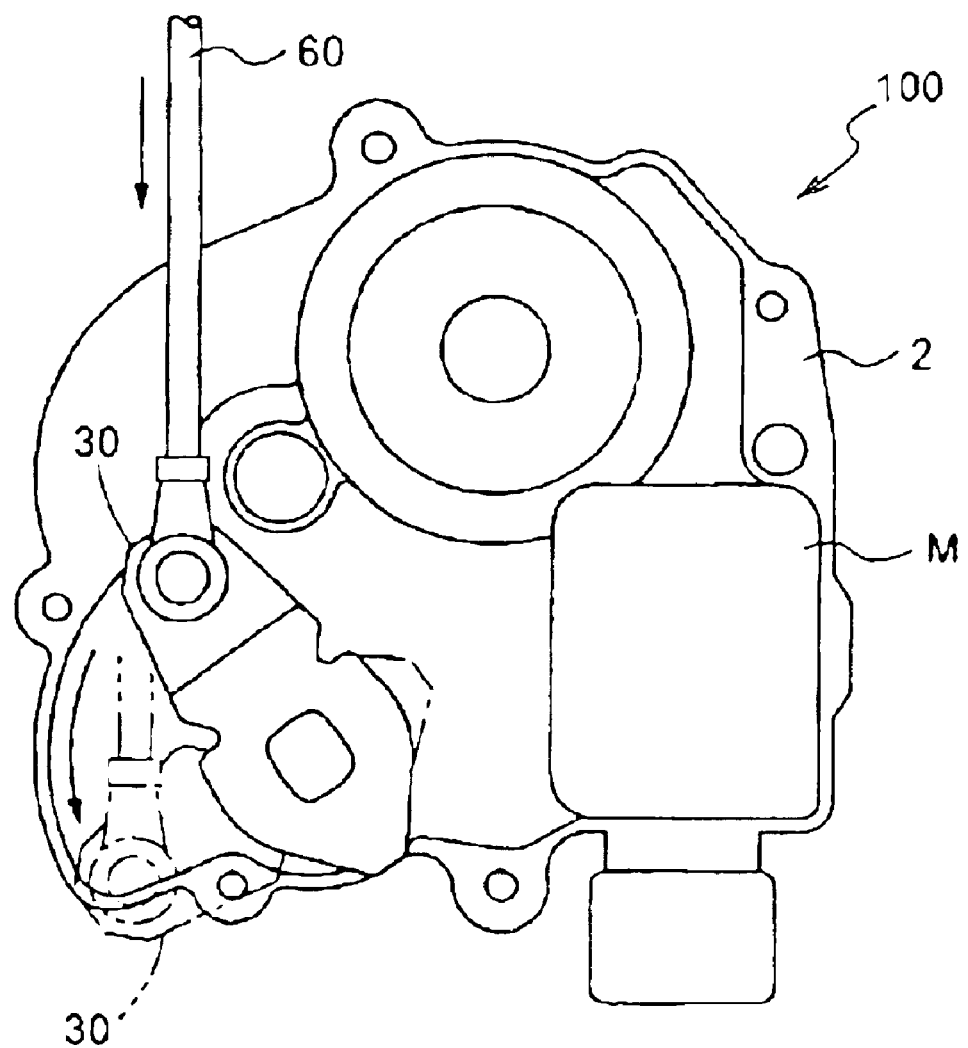
FIG. 1 is a schematic view illustrating an outer appearance of an actuator with a clutch mechanism according to a first embodiment of the present invention.

FIG. 1 illustrates an actuator 100 for disengaging a latch of a vehicle door applied with a clutch mechanism according to a first embodiment of the present invention. The clutch mechanism according to the present invention is applied, as non-limiting examples, not only for the actuator for disengaging the vehicle door latch but also for actuators for engaging the vehicle door latch or for operating a locking lever of a door lock device to a lock condition or to an unlock condition.

As illustrated in FIG. 1, the actuator 100 is provided with a chassis case 2 capable of being attached inside a vehicle door. The chassis case 2 is provided with a DC motor M as driving power source of the actuator 100 and an operating lever 30 operatively linked to a cable 60 (or a rod 60) for operating the vehicle door latch to the disengaged condition. The chassis case 2 is further provided with a power transmitting mechanism for transmitting driving force from the DC motor M to the operating lever 30.

Figure 2:
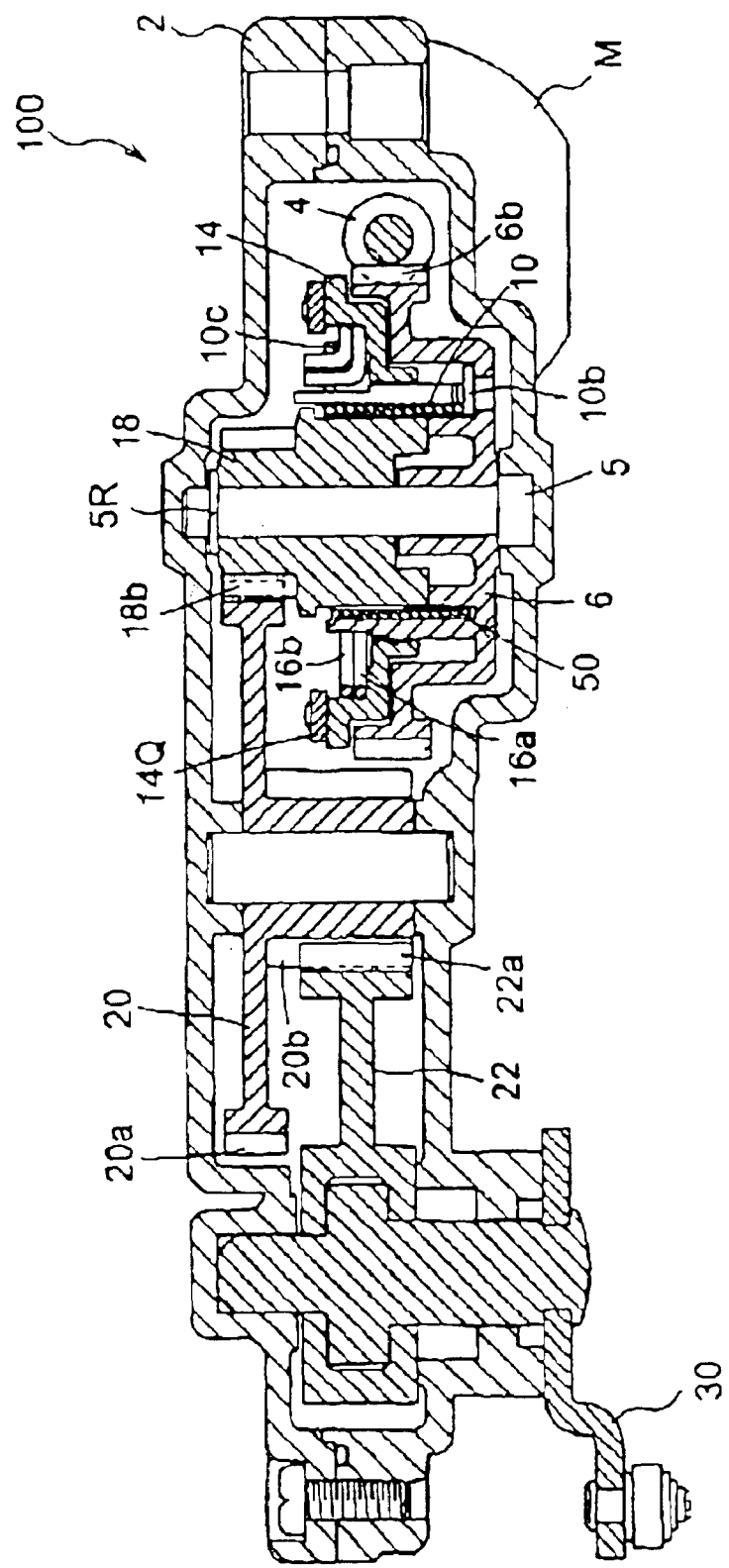
FIG. 2 is a cross sectional side view illustrating the actuator in FIG. 1.
Figure 3:
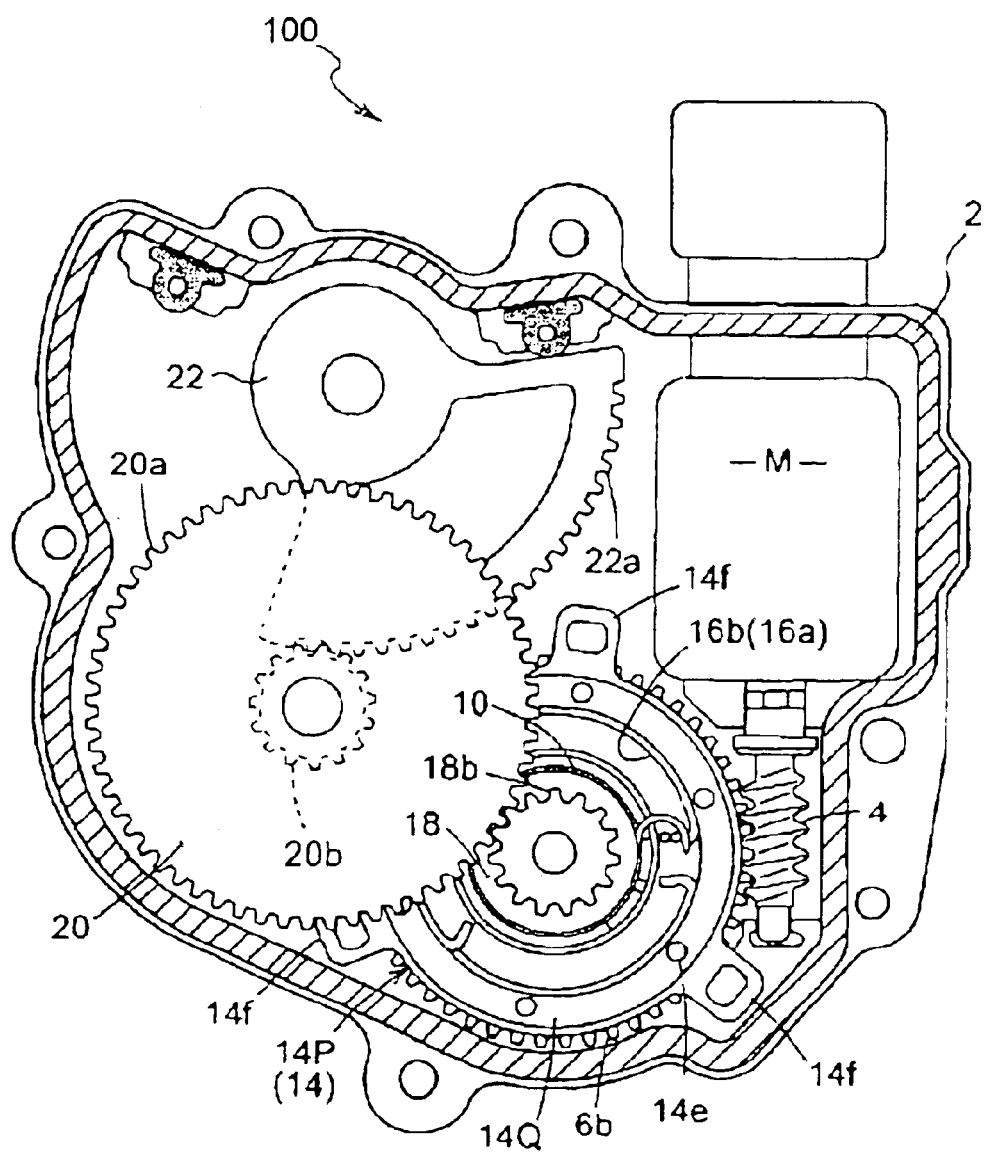
FIG. 3 is a cross sectional aerial view illustrating the actuator in FIG. 2.

As illustrated in FIGS. 2 and 3, the power transmitting mechanism includes a worm gear 4 fixed to a drive shaft of the DC motor M, an input wheel 6 having a latchet gear portion 6b engaged with the worm gear 4, a driven rotational body 18 arranged substantially coaxially with the input wheel 6, an intermediate gear 20 engaged with a gear portion 18b defined at an end of the driven rotational body 18, and an output rotational body 22 having a fan-shaped gear portion 22a engaged with the intermediate gear 20. The input wheel 6 is a first rotational member, as a non-limiting example. The driven rotational member 18 is a second rotational member, as a non-limiting example. The operating lever 30 is supported by an end of the output rotational body 22 so as not to be rotated relative thereto. The intermediate gear 20 is integrally provided with a major diameter gear portion 20a and a minor diameter gear portion 20b. A speed reduction gear mechanism is formed with the gear portion 18b and the major diameter gear portion 20a which are engaged to each other, and with the fan-shaped gear portion 22a and the minor diameter gear portion 20b which are engaged to each other.

Each of the input wheel 6, the driven rotational body 18, the intermediate gear 20 and the output rotational body 22 possesses a rotation axis which is arranged substantially in parallel to each rotation axis. Each rotation axis intersects at approximately right angles with a rotation axis of the worm gear 4. The input wheel 6 and the driven rotation body 18 are arranged in series along an outer periphery of a clutch shaft 5 fixedly housed in the chassis case 2 and are supported for free relative rotation by the clutch shaft 5. A clutch mechanism 50 is disposed between the input wheel 6 and the driven rotational body 18, which transmits rotation of the input wheel 6 in an only normal direction to the driven rotational body 18.

Figure 4:
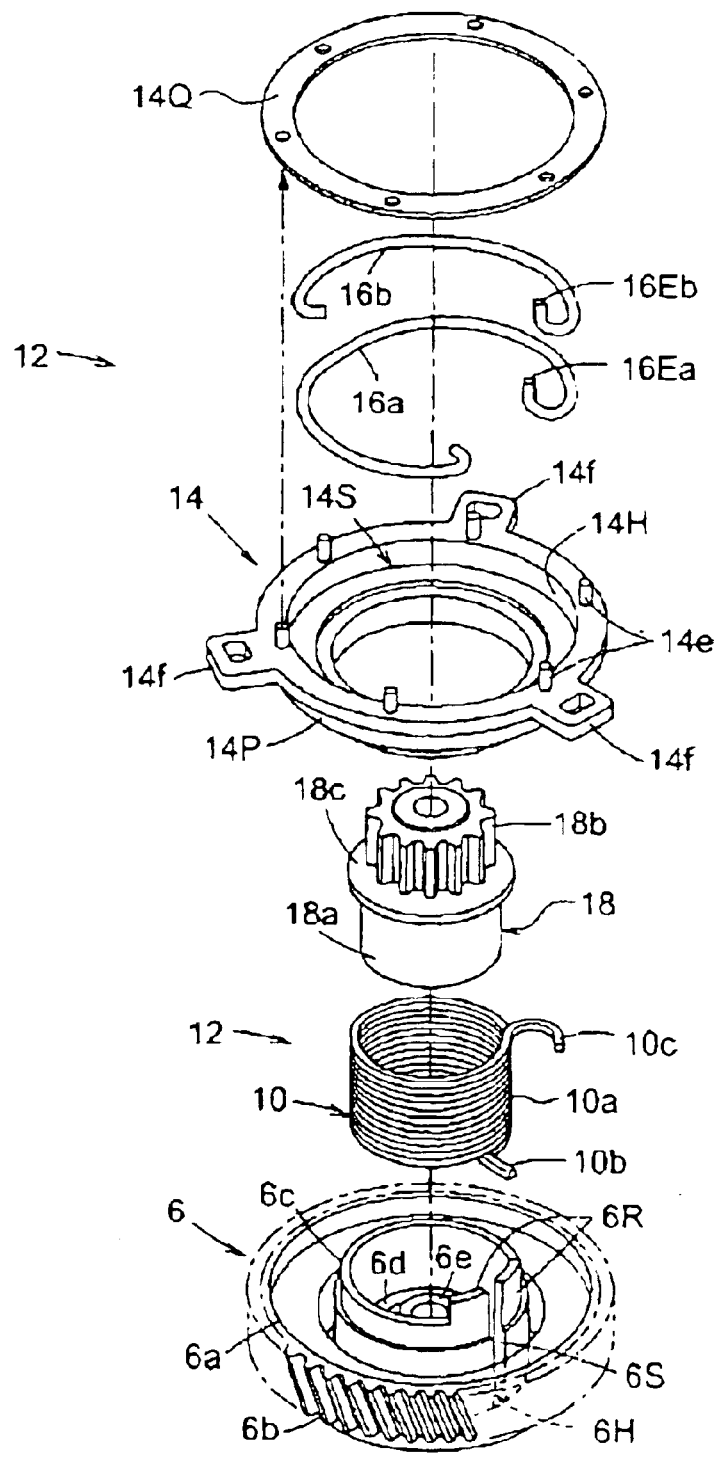
FIG. 4 is an exploded perspective view illustrating main components for the clutch mechanism applied for the actuator illustrated in FIG. 1.
Figure 5:
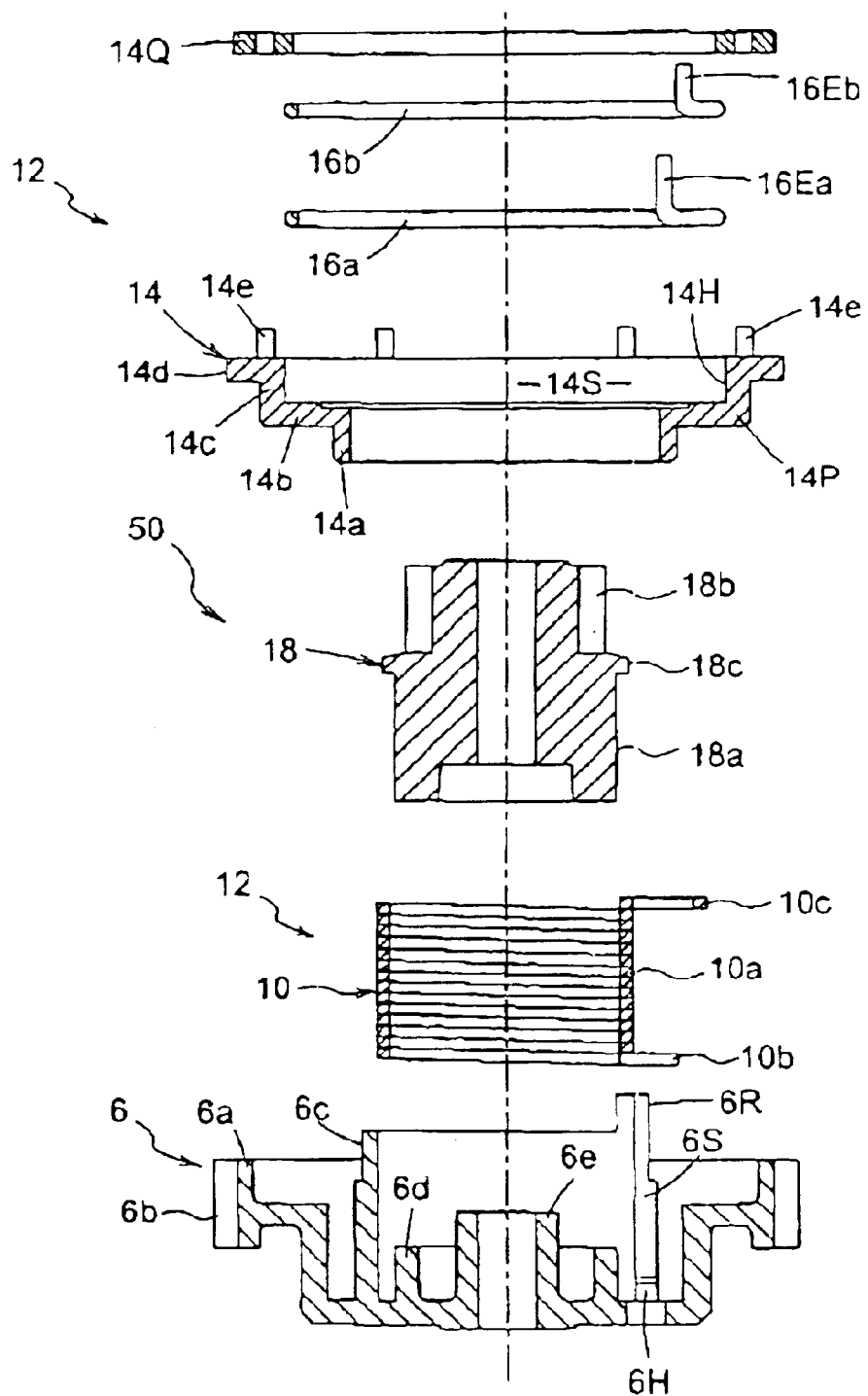
FIG. 5 is a cross sectional side view of each component for the clutch mechanism illustrated in FIG. 4.

As illustrated in FIGS. 2, 4 and 5, the clutch mechanism 50 is provided not only with the input wheel 6 and the driven rotational body 18 but also with a clutch spring 10 and rotation operating means 12. The clutch spring 10 is an operating spring, as a non-limiting example, and extends along a pressure receiving peripheral surface 18a of the driven rotational body 18. The clutch spring 10 is provided with an attached portion 10b which is a first end thereof as a non-limiting example. When the rotation operating means 12 operates, an engaged portion 10c of the clutch spring 10 can be prevented from being dragged under the influence of the normal rotation of the input wheel 6, wherein a diameter of the clutch spring 10 becomes smaller and the clutch spring 10 is wound on the pressure receiving peripheral surface 18a of the driven rotational body 18. The engaged portion 10c is a second end of the clutch spring 10 as a non-limiting example. An inner diameter of a spring main body portion 10a of the clutch spring 10 has been designed to be slightly greater than an outer diameter of the pressure receiving peripheral surface 18a of the driven rotational body 18 such that the clutch spring 18 is not substantially in contact with the pressure receiving peripheral surface 18a. Therefore, when the rotation operating means 12 has not operated, the driven rotational body 18 can be smoothly rotated with almost no friction residence applied due to the contact between the driven rotational body 18 and the clutch spring 10.

The rotation operating means 12 includes a collar member 14 and two c-shaped springs 16a and 16b. The collar member 14 is disposed at the substantially same height as the second end 10c of the clutch spring 10. The two springs 16a and 16b are respectively disposed in the collar member 14 so as to apply biasing force in an outwardly radial direction relative to an inner peripheral surface 14H on a circumference of the collar member 14. Therefore, the clutch mechanism can be downsized especially in the axial direction. Each spring 16a and 16b or a set of the springs 16a and 16b is a braking member, as non-limiting examples, which is rotatably engaged to the collar member 14 generating the biasing force applied to a peripheral slidably contact surface of the collar member 14. The biasing force may contain an element in a radial direction relative to the peripheral slidably contact surface of the collar member 14. That is, each spring 16a and 16b can be rotated relative to the collar member 14 while generating friction based upon the biasing force. Each spring 16a and 16b possesses engaging portions 16Ea and 16Eb at one end thereof, which is adjusted to engage with the engaged portion 10c of the clutch spring 10.

Figure 6:
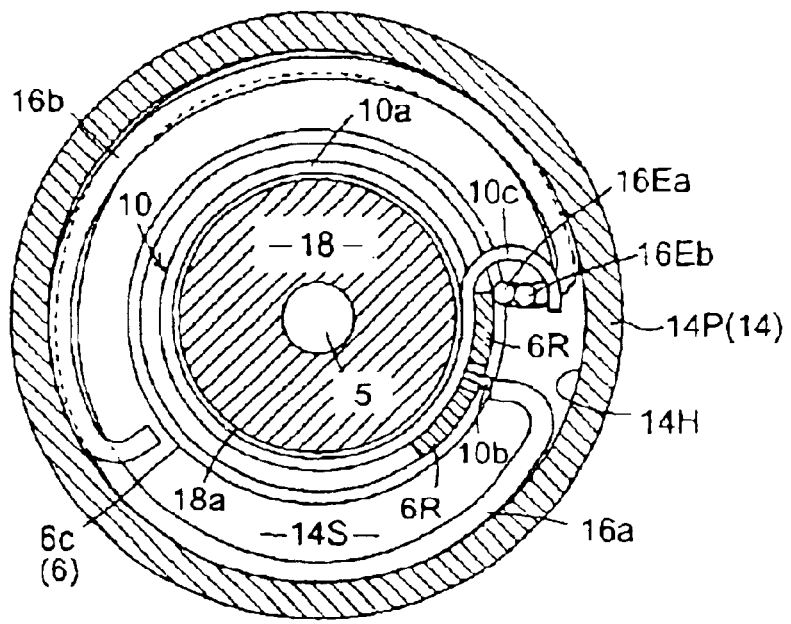
FIG. 6 is an aerial view illustrating a condition of a relevant part of the clutch mechanism.
Figure 7:
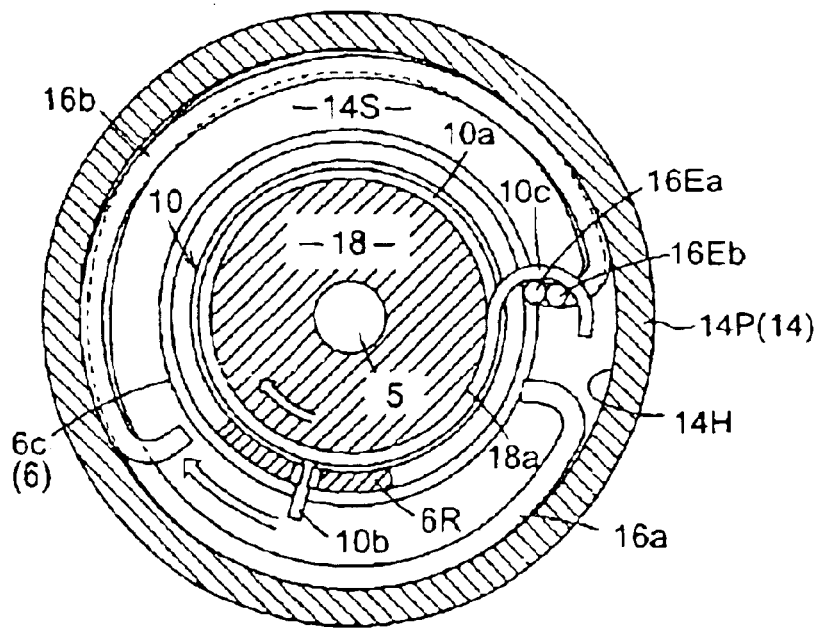
FIG. 7 is an aerial view illustrating the other condition of the relevant part of the clutch mechanism.
Figure 8:
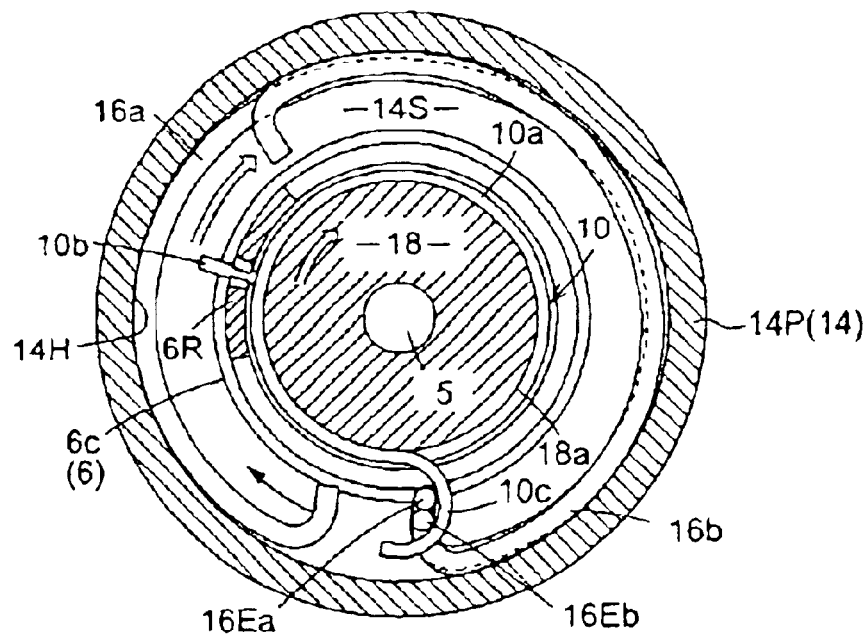
FIG. 8 is an aerial view illustrating still the other condition of the relevant part of the clutch mechanism.

When the input wheel 6 rotates in the normal direction with the attached portion 10b of the clutch spring 10 based upon the driving force by the DC motor M from a condition illustrated in FIG. 6 at which the DC motor M is inactive, the engaged portion 10c of the clutch spring 10 is not allowed to rotate by the springs 16a and 16b—i.e., the engaged portion 10c does not rotate relative to the collar member 14 yet. The normal rotational direction of the input wheel 6 is denoted with an arrow in FIG. 7. In this case, the only attached portion 10b of the clutch spring 10 rotates together with the input wheel 6 and the spring main body portion 10a is deformed so as to lessen the diameter thereof. At last, the pressure receiving peripheral surface 18a is bounded with the spring main body portion 10a as illustrated in FIG. 8. Further, the driven rotational body 18 is applied with relatively strong friction force and is rotated integrally with the clutch spring 10 and the input wheel 6. The springs 16a and 16b then starts rotating relative to the collar member 14 at the approximately same time as the aforementioned rotation. When the rotational body 18 rotates integrally with the clutch spring 10 and the input wheel 6, rotational driving force can be transmitted. While the input wheel 6 then keeps rotating in the normal direction for a predetermined period time, the operating lever 30 being supported at the one end of the output rotational body 22 operates to disengage the latch against biasing force of a torsion spring disposed in the latch mechanism.

As described above, according to the first embodiment of the present invention, the clutch mechanism is not required to have a coil for generating electromagnetic attracting force or a switching mechanism for switching electric current supply to the coil. Therefore, the clutch mechanism can be downsized to become compact and can be weight-saved such that the components can be more easily assembled for the clutch mechanism.

Figure 9:
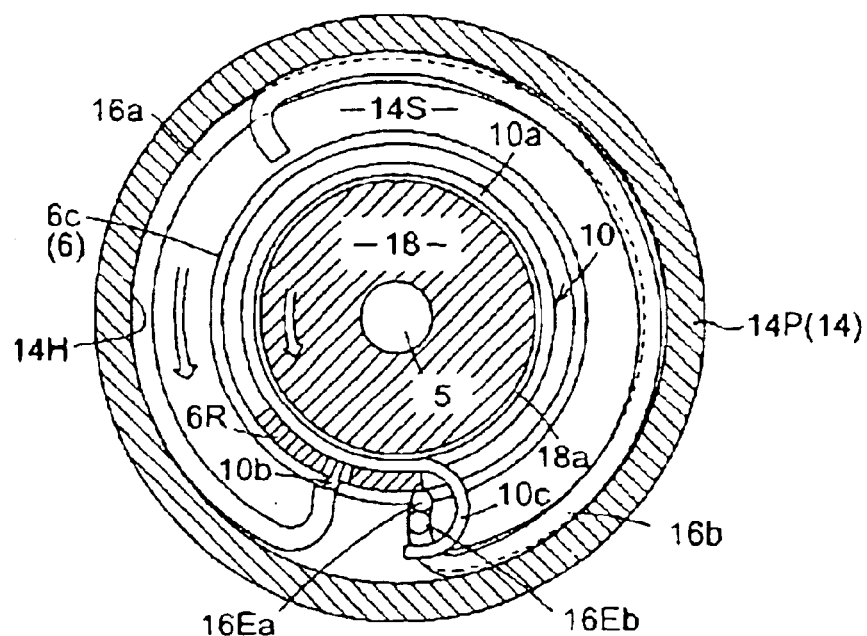
FIG. 9 is an aerial view illustrating still the other condition of the relevant part of the clutch mechanism.

The DC motor M then stops and is not supplied with electric current any more based upon a signal outputted from a sensor which detects the latch fully disengaged. A timer can be used for terminating electric current supply to the DC motor M in a predetermined period of time after starting the electric current supply thereto. The clutch spring 10 has restoring force to return to an original state at which the clutch spring 10 is not applied with any external force such that the lessened diameter of the spring 10 can be restored to the original size. Pursuant to the restoring force of the clutch spring 10, the attached portion 10b of the clutch spring 10 is operated so as to rotate the input wheel 6 and the worm gear 4 in the reverse direction along with the reverse rotation of the DC motor M as illustrated in FIG. 9. Therefore, the clutch mechanism 50 is returned to an initial condition for standing ready for the next normal rotation of the input wheel 6. As illustrated in FIG. 4, the latched gear portion 6b of the input wheel 6 possesses a chamfer angle or a leading angle beyond a predetermined angle value so as to drive the worm gear 4 for rotation based upon the driving force from the input wheel 6.

When the input wheel 6 actually rotates in the reverse direction, each engaging portion 16Ea and 16Eb can be can be easily disengaged from the engaged portion 10c of the clutch spring 10. Therefore, both of the engaged portion 10c and the engaging portions 16Ea and 16Eb can be effectively prevented from being damaged therebetween.

Next, the following description will be given for explaining detailed structure of the clutch mechanism 50.

As illustrated in FIGS. 4 and 5, the clutch spring 10 includes the spring main body portion 10a in a cylindrical structure, the attached portion 10b extending in the outwardly radial direction from a bottom end of the spring main body portion 10a, and the semi-circular engaged portion 10c extending in the outwardly radial direction from an upper end of the spring main body portion 10a. The input wheel 6 includes a discoid wheel main body 6a, the latchet gear portion 6b, a boss portion 6e, and a spring holding portion. The latchet gear portion 6b is integrally defined at an outer peripheral surface of the wheel main body 6a and extends in the outwardly radial direction therefrom. The boss portion 6e is defined at a central portion of the wheel main body 6a and extends along an axial direction of the clutch shaft 5 upwards in FIG. 4 such that the clutch shaft 5 can be inserted into the boss portion 6e. The spring holding portion is provided between the outer peripheral surface of the wheel main body 6a and the boss portion 6e. The spring holding portion includes a main sleeve portion 6c, of which axial length substantially corresponds to an axial length of the spring main body portion 10a, and an auxiliary sleeve portion 6d, of which axial length is shorter than the axial length of the main sleeve portion 6d. The auxiliary sleeve portion 6d is arranged at an inner diameter side of the main sleeve portion 6c. The main sleeve portion 6c is a cylindrical guiding member, as a non-limiting example. Therefore, a clearance dimension between the clutch spring 10 and the driven rotational body 18 can be maintained at a constant length by the spring holding portion. Further, the spring holding portion can act for maintaining response of the clutch mechanism at a certain time level. That is, the spring holding portion can act for maintaining a time for the driven rotational body 18 to start rotating together with the input wheel 6. Still further, the spring holding portion can act for preventing the free rotation of the driven rotational body 18 from being hindered due to friction of the clutch spring 10. The wheel main body 6a, the latchet gear portion 6b, the main sleeve portion 6c, and the auxiliary sleeve portion 6d are integrally formed by injecting synthetic resin into a mold.

Figure 10:
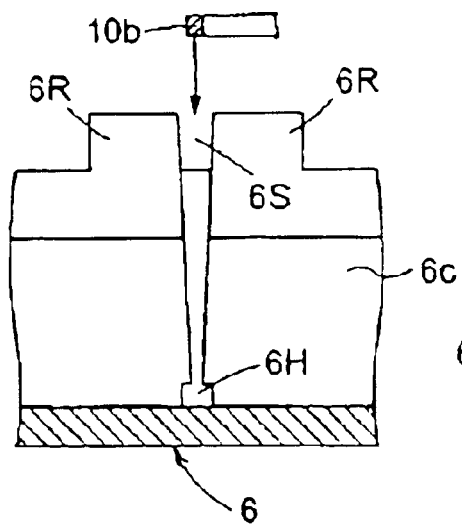
FIG. 10(a) is a side view illustrating a slit of an input wheel and a method of fitting a first end of a clutch spring thereinto.
FIG. 10(b) is a side view illustrating the slit of the input wheel and the first end of the clutch spring fitted thereinto.
Figure 10:
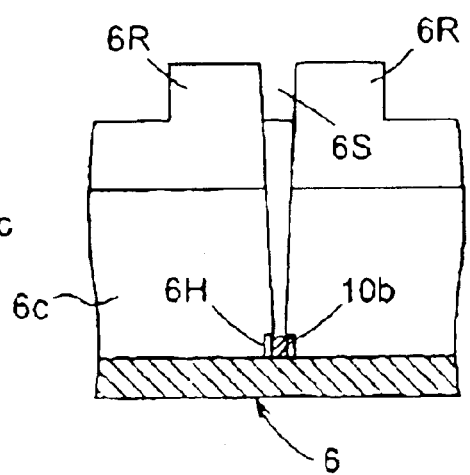

As illustrated in FIGS. 4, 5 and 10, the main sleeve portion 6c may be provided with a restraining wall portion 6R projecting at an upper tip end thereof. The restraining wall portion 6R restrains the engaged portion 10c of the clutch spring 10 from rotating in a spring rewinding direction along with an unnecessary reverse rotation of the input wheel 6, thereby enabling to prevent the clutch spring 10 from being defuctionalized due to deformation thereof with excess increase of the diameter thereof. Further, the restraining wall portion 6R can prevent the engaged portion 10c from being moved relative to the attached portion 10b along the reverse rotation of the input wheel 6, in which the restraining wall portion 6R can prevent the clutch spring 10 from being broken. The restraining wall portion 6R is a restraining member, as a non-limiting example. For example, when the input wheel 6 rotates in the reverse direction as denoted with an arrow in FIG. 11(a) from a condition as illustrated in FIG. 11(a), at which the DC motor M has not rotated in either direction illustrated in FIG. 11(a), the engaged portion 10c of the clutch spring 10 rotates following the reverse rotation of the input wheel 6. In this case, there may a possible case that the engaged portion 10c is pushed at an outer peripheral portion thereof by the engaging portions 16Ea and 16Eb as illustrated in FIG. 11(b). However, the engaged portion 10c can be preferably stopped from further rotation by the restraining wall portion 6R. Therefore, the engaged portion 10c and the attached portion 10b are rotated integrally with the restraining wall portion 6R, and a relative positional relationship between the engaged portion 10c and the attached portion 10b does not vary. For example, even when the engaged portion 10c rotates in the reverse direction dragging the springs 16a and 16b, the relative positional relationship therebetween does not vary. Therefore, the engaged portion 10c can be prevented from rotating in the rewinding direction due to the contact with the engaging portions 16Ea and 16Eb.

The main sleeve portion 6c includes a penetrating hole 6H at an lower end thereof, into which the attached portion 10b of the clutch spring 10 can be fitted. The main sleeve portion 6c is further provided with a slit 6S as a guide groove for guiding the attached portion 10b to the penetrating hole 6H. The penetrating hole 6H is an attaching portion as a non-limiting example. The slit 6S is a guiding groove as a non-limiting example. The slit 6S is a tapered slit of which space becomes gradually smaller towards the penetrating hole 6H from the radially central portion of the restraining wall portion 6R. A bottleneck portion at the lowest portion of the tapered portion of the slit 6S is designed to have a dimension which is smaller than an outer diameter of a wire of the clutch spring 10. Therefore, when the components are assembled for the clutch mechanism 50, the attached portion 10b first goes into a wide space at an upper portion of the slit 6S, and the spring main body portion 10a is pushed along an inner surface of the main sleeve portion 6c, wherein the attached portion 10b can bridge the bottleneck portion of the slit 6S and can be fitted into the penetrating hole 6H. The cross sectional dimension of the penetrating hole 6H substantially exceeds the outer diameter of the wire of the clutch spring 10. The input wheel 6 is made of a flexible material such as resin, which can deform to easily accomplish the press-fitting of the attached portion 10b. The press-fitted condition of the attached portion 10b is illustrated in FIG. 10(b).

Figure 11:
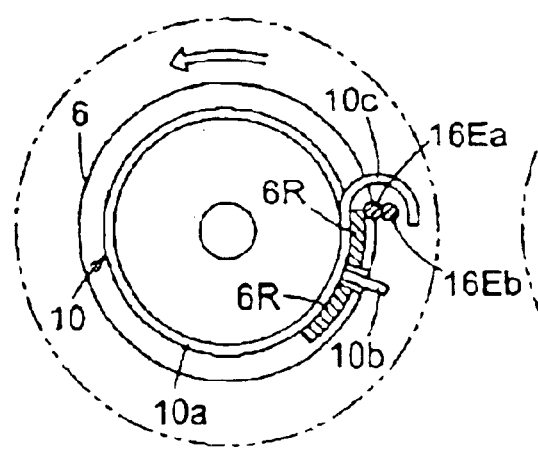
FIG. 11(a) is a sectional aerial view illustrating a restraining wall portion of the input wheel and a second end of the clutch spring.
FIG. 11(b) is another sectional aerial view illustrating the restraining wall portion of the input wheel and the second end of the clutch spring.
Figure 11:
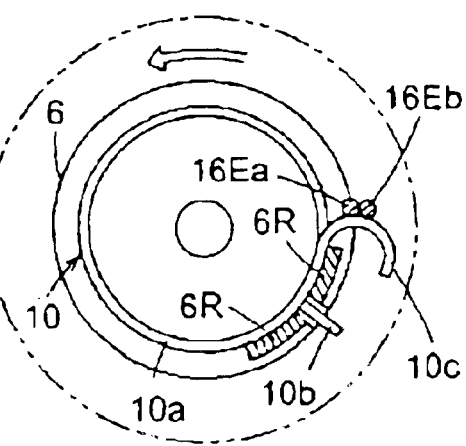

When the clutch spring 10 is arranged as described above, the spring main body portion 10a is housed in a cylindrical space defined between the main sleeve portion 6c and the auxiliary sleeve portion 6d. More particularly, when the clutch mechanism 50 has not been applied with the driving force to rotated in the normal direction as illustrated in FIG. 11}(a), the clutch mechanism 50 is at a disconnected condition. In this case, the main sleeve portion 6c and the auxiliary sleeve portion 6d collaborate to hold the clutch spring 10 at a proper posture so as not to bring the spring main body portion 10a into a contact with the pressure receiving peripheral surface 18a of the driven rotational body 18. In this case, the restraining wall portion 6R may be slightly in contact with the engaged portion 10c of the clutch spring 10 or may push the engaged portion 10c in a direction to narrow down the diameter of the clutch spring 10 with very slight pushing force.

As illustrated in FIGS. 4 and 5, the collar member 14 is provided with a collar main body 14P which is integrally molded with synthetic resin and a lid member 14Q to be fixed to the collar main body 14P. As illustrated in FIG. 5, the collar main body 14P includes a first sleeve portion 14a, a first disc portion 14b, a second sleeve portion 14c, and a second disc portion 14d. The main sleeve portion 6c of the input wheel 6 is fitted into a cylindrical portion of the first sleeve portion 14a. The first disc portion 14b is a disc extending in an outwardly radial direction from an upper end of the first sleeve portion 14a. The second sleeve portion 14c extends in an upper direction in FIG. 5 from an outer edge portion of the first disc portion 14b and defines the inner peripheral surface 14H as a slidably contact surface. The second disc portion 14d is also a disc extending in an outwardly radial direction from an upper end of the second sleeve portion 14c. Plural projections 14e stand upright at an upper surface of the second disc portion 14d. Further, three mounting flanges 14f extend in the outwardly radial direction from an outer periphery of the second disc portion 14d.

The lid member 14Q is a disc member also molded with material such as synthetic resin and is provided with penetrating holes corresponding to the respective projections 14e of the collar main body 14P. The lid member 14Q is pushed to the upper surface of the second disc portion 14d while the projections 14e have fitted into the penetrating holes. The projections 14e are then welded with an iron such that the collar main body 14P and the lid member 14Q are integrated as a single unit. An inner peripheral edge of the lid member 14Q slightly inwardly projects from the inner peripheral surface 14H of the second sleeve portion 14C. The projected portion of the lid member 14Q collaborates with the first disc portion 14b and the second sleeve portion 14c so as to define a housing space 14S capable of housing the C-shaped springs 16a and 16b therein. The collar member 14 can be provided as a single part integrated with the collar main body 14P and the lid member 14Q. Alternatively, the collar member 14 can be provided as a single part integrated with the collar main body 14P and the lid member 14Q with the springs 16a and 16b already housed in the housing space 14S.

The driven rotational body 18 is provided with a main body having the pressure receiving peripheral surface 18a of which outer diameter is approximately the same size as the outer diameter of the auxiliary sleeve portion 6d, and a gear portion 18b extending upright from an upper end of the main body. A flange portion 18c slightly projects in an outwardly radial direction between the pressure receiving peripheral surface 18a and the gear portion 18b such that the spring main body portion 10a of the clutch spring 10 can be held approximately at a height of the pressure receiving peripheral surface 18a. When the aforementioned components are assembled, the clutch shaft 5 disposed to a half body of the chassis case 2 of the actuator 10 is fitted into the input wheel 6 with the clutch spring 10 being disposed therein. The driven rotational body 18 is then fitted with the clutch shaft 5 and positioned into the spring main body portion 10a of the clutch spring 10. An E ring 5R is installed at a tip end of the clutch shaft 5 such that the input wheel 6 and the driven rotational body 18 are positioned and can be prevented from being dropped off. Secondly, the collar member 14 with the springs 16a and 16b housed therein is installed so as to cover an upper surface of the input wheel 6. The collar member 14 is fixed to the chassis case 2 by use of fixing members such as screws through penetrating holes of the mounting flanges 14f.

As illustrated in FIG. 4, each C-shaped spring 16a and 16b has a shape defining a portion of an oval when not being applied with any external force. When each C-shaped spring 16a and 16b is applied with external force from an outwardly radial side, each spring 16a and 16b deforms decreasing the size of the diameter. Each deformed spring 16a and 16b is housed in the housing space 14S of the collar member 14. In this case, each spring 16a and 16b generates repulsive force in an outwardly radial direction relative to the inner peripheral surface 14H of the collar member 14 and is independently held at a posture defining a portion of a circle along the inner peripheral surface 14H as illustrated in FIGS. 2 and 6. The repulse force of each spring 16a and 16b is biasing force as a non-limiting example. Therefore, the clutch mechanism is not required to have a fixing member for fixing the braking member at an upper surface of the collar member 14, thereby leading to downsizing of the clutch mechanism. Further, each spring 16a and 16b can be assembled in an easy manual manner to be disposed in the collar member 14. The inner peripheral surface 14H has a straight through cross section extending approximately in parallel with the clutch shaft 5, and further has an axial length for housing the springs 16a and 16b approximately in parallel with an axis of the clutch shaft 5. The spring 16a is housed at a side adjacent to the first disc portion 14b, and the spring 16b is housed at an upper side of the spring 16a in FIG. 5. The spring 16a has an entire length corresponding to about an angle 330° of the circumference of the inner peripheral surface 14H, and the spring 16b has an entire length corresponding to about an angle 210' thereof. Each engaging portion 16Ea and 16Eb is formed at the same side of each spring 16a and 16b in the circumferential direction thereof and is bent at about 90° to be parallel with the axis of the clutch shaft 5.

As illustrated in FIG. 6, each engaging portion 16Ea and 16Eb is positioned so as to be captured by the semi-circle engaged portion 10c. When the assembling of the components is completed, only each engaged portion 16Ea and 16Eb is positioned in a rotational track of the engaged portion 10c to be moved along with the rotation of the input wheel 6. Therefore, even if each engaging portion 16Ea and 16Eb is housed in the housing space 14S of the collar member 14 at different angles and positions, each engaging portion 16Ea and 16Eb is displaced by the fixed portion 10c of the clutch spring 10 which may rotate in response to normal rotation of the input wheel 6 at an only appropriate angle after setting the collar member 14 to cover the upper surface of the input wheel 6. In this case, each engaging portion 16Ea and 16Eb is brought to a normal initial condition at which each engaging portion 16Ea and 16Eb is centered to an approximately identical position to stand ready for the normal rotation of the input wheel 6.

As described above, each spring 16a and 16b has a different entire length. Therefore, each spring 16a and 16b exerts the maximum biasing force to a different portion of the inner peripheral surface 14H which is actually a slidably contact surface between the collar member 14 and each spring 16a and 16b. The direction of the load applied to the inner peripheral surface 14H disperses in the circumferential direction thereof, thereby generating a constant braking force equally applied. In this case, each spring 16a and 16b can be always maintained at a stable posture. For example, even when there is any fluctuation among the manufactured C-shaped springs in regard to a biasing force of each spring, or even when there is fluctuated dispersion of the biasing force in the circumferential direction of the spring, each biasing force generated from each spring can be applied to the collar member 14 substantially at the same time. Further, each biasing force can be averagely distributed and can be adjusted to a predetermined biasing force level which is required. Alternatively, there is a biasing force distribution map in which the data smoothly varies along the circumferential direction of the spring. Therefore, according to the embodiment of the present invention, such a smooth switching operation is performed and the clutch mechanism can become durable.

As described above, each spring 16a and 16b can be referred to as a braking member, as a non-limiting example, rotatably housed in the collar member 14 generating the biasing force containing an element applied in the radial direction relative to the slidably contact surface of the collar member 14.

As described above, each spring 16a and 16b is provided with each engaging portion 16Ea and 16Eb. As illustrated in FIG. 7, when the input wheel 6 rotates in the normal direction, the springs 16a and 16b are applied with a force to be pulled away from the inner peripheral surface 14H by the engaged portion 10c of the clutch spring 10. Therefore, each spring 16a and 16b can generate more stable braking force at the initial condition in which the engaged portion 10c of the clutch spring 10 is prevented from rotating by the stationary springs 16a and 16b, or can generate more stale braking force when starting rotation relative to the second sleeve portion 14c by the engaged portion 10c ultimately dragged for rotation by the input wheel 6. When the springs 16a and 16b are at the initial condition, the clutch mechanism 50 has not been connected yet. In the meantime, when each spring 16a and 16b starts rotation, the clutch mechanism 50 has just started being connected.

Next, the following description will be given for explaining an operation of the actuator 100 for disengaging the latch for example for the vehicle door.

When the DC motor M rotates in the normal direction in response to a radio wave emitted from for example a keyless switch while the vehicle door has been latched, the input wheel 6 is rotated in the normal direction together with the attached portion 10b of the clutch spring 10 via the worm gear 4. The engaged portion 10c of the clutch spring 10 may be almost dragged along with the normal rotation of the input wheel 6. However, the engaged portion 10c is immediately engaged with each engaging portion 16Ea and 16Eb, in which the rotation operating means 12 functions. That is, the braking force by each spring 16a and 16b applied to the collar member 14 first exceeds a force for maintaining the shape of the clutch spring 10—i.e., a force for maintaining the engaged portion 10c at a predetermined position, wherein the springs 16a and 16b keeps to be stationary. Accordingly, the attached portion 10b of the clutch spring 10 is rotated in the direction denoted with an arrow in FIG. 7 and gradually pulled away from the disengaged portion 10c. The diameter of the spring main body portion 10a of the clutch spring 10 is decreased depending on pull-away of the attached portion 10b from the engaged portion 10c, in which the pressure receiving peripheral surface 18a of the driven rotational body 18 is tightened and restrained by the spring main body portion 10a. When the pressure receiving peripheral surface 18a is almost fully tightened by the spring main body portion 10a, the clutch spring 10 is rotated integrally with the driven rotational body 18 via a strong friction force. At this point, the diameter of the clutch spring 10 can not be reduced any more such that each spring 16a and 16b starts rotating by a traction force of the engaged portion 10c against the friction resistance relative to the collar member 14. Further, the driven rotational body 18, the intermediate gear 20, and the output rotational body 22 can be also rotatably driven. The operating lever 30 supported at the one end of the output rotational body 22 is pivotaly operated in a direction denoted with an arrow in FIG. 1. As described above, the vehicle latch is disengaged via the cable 60 linked to the operating lever 30—i.e., the lever 30 is moved to a position denoted with a dashed line illustrated in FIG. 1. As described above, the engaged portion 10c of the clutch spring 10, and each engaging portion 16Ea and 16Eb can be manufactured with a simply manufacturing process. The engaged portion 10c can be engaged with each engaging portion 16Ea and 16Eb when needed.

As illustrated in FIG. 8, a difference in dimension between the inner diameter of the spring main body portion 10a and the outer diameter of the pressure receiving peripheral surface 18a, and the length of the spring main body portion 10a have been designed to tighten the pressure receiving peripheral surface 18a by the spring main body portion 10a only when the engaged portion 10c of the clutch spring 10 rotates at an angle sufficiently smaller than the angle of 360° in a circumferential direction of the clutch shaft 5 along with the normal rotation of the input wheel 6. According to the first embodiment of the present invention, the engaged portion 10c rotates at about 270°. Therefore, the engaged portion 10c can be rotated without being hindered by the restraining wall portion 6R.

When the latch mechanism is then fully disengaged, the rotation of the DC motor M is terminated based upon the signal outputted from a sensor which detects the full disengagement. In this case, the electric current supply to the DC motor M is also terminated. The attached portion 10b of the clutch spring 10 immediately rotates the input wheel 6 and the worm gear 4 in the reverse direction together with the DC motor M based upon the restoring force of the clutch spring 10 to return to the original condition at which no external force is applied thereto. The restored clutch spring 10 goes away from the pressure receiving peripheral surface 18a of the driven rotational body 18, wherein the clutch mechanism 50 is returned to the initial condition at which the input wheel 6 stands ready for the next normal rotation. In the meantime, the driven rotational body 18, the intermediate gear 20, and the output rotational body 22 are freely rotated relative to the input wheel 6. Therefore, the operating lever 30 is returned to an initial condition—i.e., to a condition illustrated with a solid line in FIG. 1, by biasing force of the torsion spring disposed in the door latch mechanism.

According to a modified embodiment of the present invention, the engaging portions 16Ea and 16Eb can be provided at end portions at the left sides of the springs 16a and 16b in FIG. 4, respectively. In this case, the springs 16a and 16b can be pushed to the inner peripheral surface 14H of the collar member 14 by the engaged portion 10c of the clutch spring 10. Therefore, even a spring having less repulsive force can generate sufficient braking force. The braking member can be only a single spring such as the C-shaped spring 16a or 16b, or can be plural springs such as three C-shaped springs or more than that.

Figure 12:
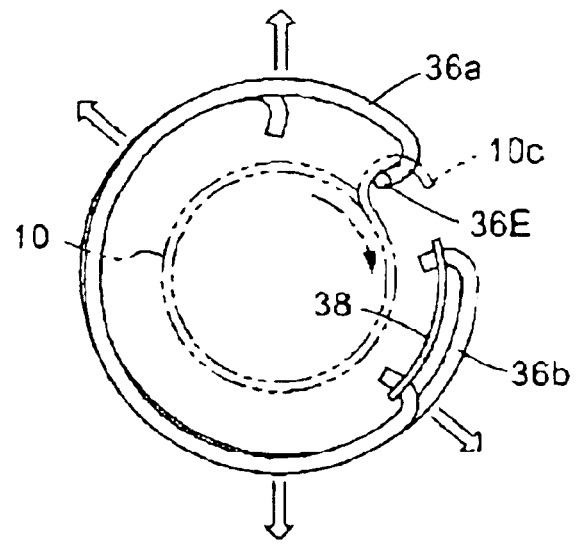
FIG. 12 is an aerial view illustrating a braking member of the clutch mechanism according to a second embodiment of the present invention.

According to a second embodiment of the present invention, linking means can be disposed for restraining a relative movement between the plural C-shaped springs in the circumferential direction of the collar member 14. As illustrated in FIG. 12, the linking means can be represented by a member 38 linking each end portion of C-shaped springs 36a and 36b. The member 38 may be a metal-made band. Although each spring 36a and 36b possesses an equal length in the circumferential direction, each spring 36a and 36b is arranged with a phase difference at an approximate angle of 30° by the member 38. Therefore, repulsive force can be applied at dispersed portions denoted with four arrows in FIG. 12. In this case, the only spring 36a can be provided with an engaging portion 36E to engage the engaged portion 10c of the clutch spring 10 therewith. The C-shaped spring 36a is applied with a force to be pulled away from the inner peripheral surface 14H of the collar member 14 by the engaged portion 10c when the input wheel 6 rotates in the normal direction. In the meantime, the other spring 36b is applied with a force to be struck toward the inner peripheral surface 14H.

Figure 13:
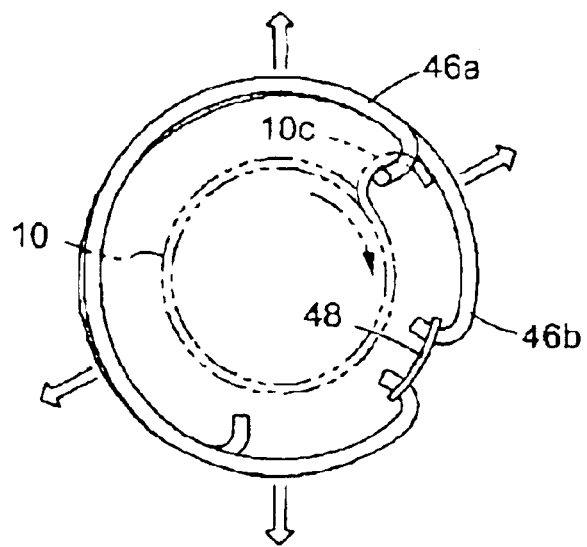
FIG. 13 is an aerial view illustrating the braking member of the clutch mechanism according to a third embodiment of the present invention.

According to a third embodiment of the present invention, the braking member can include two C-shaped springs 46a and 46b and a member 48 linking the two springs 46a and 46b as illustrated in FIG. 13. The member 48 can be a metal-made band. When the input wheel 6 rotates in the normal direction, the two C-shaped springs 46a and 46b are applied with force to be pulled away from the inner peripheral surface 14H by the engaged portion 10c of the clutch spring 10.

Figure 14:
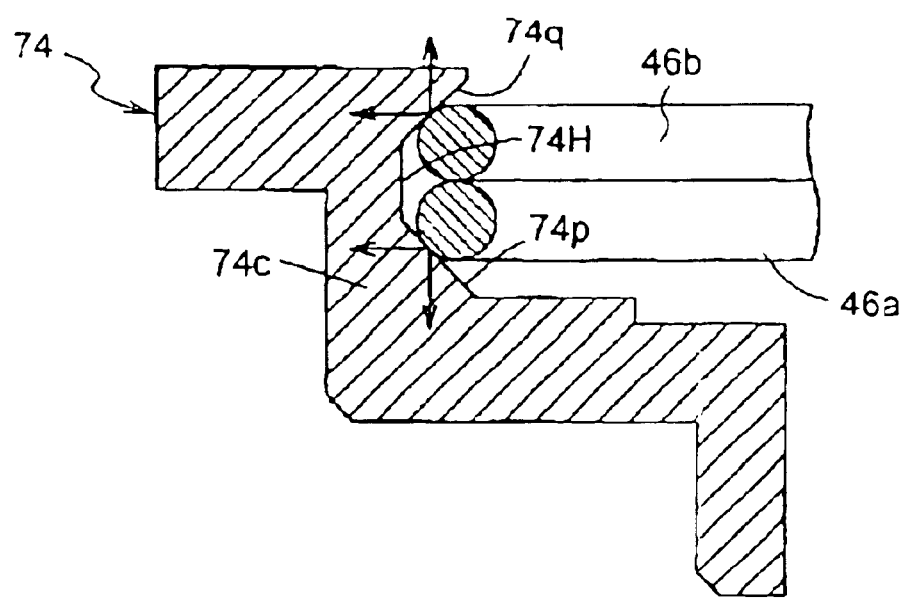
FIG. 14 is a cross-sectional side view illustrating a collar member of the clutch mechanism according to a fourth embodiment of the present invention.

According to a fourth embodiment of the present invention, the biasing force of the braking member applied to the slidably contact surface of the collar member can contain not only the element in the radial direction but also an element in the axial direction. For example, as illustrated in FIG. 14, an inner peripheral surface 74H of a collar member 74 is provided with two conic surfaces 74p and 74q sloping in opposite directions relative to the axis of the clutch shaft 5. Two C-shaped springs 46a and 46b are disposed therein with biasing force containing the element in the outwardly radial direction and an element in the axial direction at the same time. The C-shape spring 46a exerts not only the element in the outwardly radial direction but also an element in a downward direction along the axis. The C-shaped spring 46b exerts not only the element in the outwardly radial direction but also the element in an upper direction along the axis.

According to this structure, the springs 46a and 46b can be prevented from projecting or being dropped out by the conic surface 74q. Therefore, the lid member 14Q is not required to be provided. The braking force of each spring 46a and 46b, and the total braking force of the springs can be freely designed not only by changing the biasing force of each spring 46a and 46b but also by individually designing the sloping angle of each surface 74p and 74q of the inner peripheral surface 74H.

According to the above-described embodiments, the braking member possesses the C-shaped structure. Alternatively, ends of the braking member can be away from each other while the braking member has not been applied with any external force outside the housing space 14S. Once the braking member is housed in the housing space 14S, the braking member has an O-shaped structure with the both overlapping ends. When this type of braking member has been engageably housed in the housing space 14S, the one end thereof is pushed to a bottom surface of the lid member 14Q by the biasing force of the spring in a direction along an axis penetrating at right angles with a surface including a ring shape of the spring. The other end thereof is pushed to a bottom surface of the first disc portion 14b. Therefore, the spring can be stabilized in the axial direction. Further, the spring can be rotated generating biasing force containing an element in an yielding direction relative to the slidably contact surface of the collar member.

Still further, an outer peripheral surface can be provided at the collar member fixed to the main body of the actuator. In this case, the C-shaped spring, which has a shape defining a portion of the oval when not being applied with any external force, is housed generating biasing force in the outwardly radial direction relative to the outer peripheral surface. Accordingly the braking member can prevent the engaged portion 10c from being dragged along with the normal rotation of the input wheel 6.

The principles, the preferred embodiments and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A clutch mechanism comprising:
    a first rotational member supported to be rotated by a driving force from a driving power source;
    a rotatably supported second rotational member coaxially positioned with respect to the first rotational member;
    an operating spring extending along a peripheral surface of the first rotational member and a peripheral surface of the second rotational member, the operating spring having a first end and a second end, with the first end attached to the first rotational member so that the first end of the spring rotates with the first rotational member;
    restraining means for restraining rotation of the second end of the operating spring during rotation of the first rotational member in one direction so that during rotation of the first rotational member in the first direction the diameter of the operating spring is reduced to cause the operating spring to engage the peripheral surface of the second rotational member so that the first and second rotational members rotate together, wherein said restraining means includes at least one braking member having an engaging portion engageable with the second end of the operating spring; and
    a collar member installed towards the second end of the operating spring, the at least one braking member being rotatably disposed at the collar member and generating a radially directed biasing force relative to a circumferential contact surface of the collar member.

2. A clutch mechanism according to claim 1, wherein the contact surface of the collar member is an inner peripheral surface of the collar member, and the at least one braking member is disposed in the collar member in contact with the inner peripheral surface of the collar member and exerts the biasing force in a radially outward direction relative to the inner peripheral surface of the collar member.

3. A clutch mechanism according to claim 1, wherein the second end of the operating spring is provided with an approximately half-circle shaped engaged portion extending in a radially outward direction, and the engaging portion of the at least one braking member being formed as a bent end portion of the at least one braking member which is adapted to be received in the engaged portion of the operating spring.

4. A clutch mechanism according to claim 3, wherein upon rotation of the first rotational member in one direction, the engaged portion of the operating spring applies a force to the engaging portion of the at least one braking member which pulls the at least one braking member away from the contact surface of the collar member.

5. A clutch mechanism according to claim 4, wherein the at least one braking member comprises a C-shaped spring.

6. A clutch mechanism according to claim 1, wherein the means for restraining rotation of the second end of the operating spring during rotation of the first rotational member in the one direction comprises at least one C-shaped spring.

7. A clutch mechanism according to claim 1, wherein the means for restraining rotation of the second end of the operating spring during rotation of the first rotational member in the one direction comprises first and second C-shaped springs.

8. A clutch mechanism according to claim 7, wherein the first and second C-shaped springs each have an engaging portion adapted to engage the second end of the operating spring, the engaging portion of the first C-shaped spring and the engaging portion of the second C-shaped spring being provided at the same side of the engaging portion of the second C-shaped spring in a circumferential direction of the spring.

9. A clutch mechanism according to claim 7, further comprising:
    linking means for linking the first and second C-shaped springs to restrain relative movement between the first and second C-shaped springs in a circumferential direction.

10. A clutch mechanism according to claim 1, further comprising:
    means for holding the operating spring to be coaxial with the first 5 rotational member and the second rotational member prior to application of the driving force from the driving power source.

11. A clutch mechanism according to claim 1, further comprising:

a restraining member for restraining relative movement between the 10 first end of the operating spring and the second end of the operating spring upon rotation of the first rotational member in a direction opposite the one direction.

12. A clutch mechanism according to claim 11, wherein the operating spring comprises a cylindrical main body and a radially outwardly extending engaged portion at the second end of the operating spring, the first rotational member comprising a guiding member housing the cylindrical main body of the operating spring, and wherein the restraining member comes in contact with the engaged portion of the operating spring upon rotational movement of the first rotational member in a direction opposite the one direction.

13. A clutch mechanism according to claim 12, wherein the first rotational member further comprises an attaching portion for attaching the first end of the operating spring to the first rotational member, and wherein the guiding member comprises a guiding groove extending towards the attaching portion to permit the first end of the operating spring to be moved 10 towards the attaching portion.

14. A clutch mechanism according to claim 13, wherein at least a portion of the guiding groove possesses a tapering shape narrowing towards the attaching portion.

15. A clutch mechanism according to claim 14, wherein the guiding groove is a tapering slit which becomes more narrow towards the attaching portion, the guiding groove also possessing a bottleneck portion between an end of the slit and the attaching portion, the bottleneck portion having a dimension smaller than an outer diameter of the first end of the operating spring.

16. A clutch mechanism comprising:
a rotatably supported first rotational member adapted to be rotated by a driving force from a driving power source;
a rotatably supported second rotational member coaxially positioned with respect to the first rotational member;
an operating spring comprising a body portion extending around a peripheral portion of the first rotational member and a peripheral portion of the second rotational member, the main body of the operating spring possessing a diameter, the operating spring also possessing first and second ends located adjacent opposite axial ends of the body portion, the first end of the operating spring engaging a portion of the first rotational member;
at least one braking member having an engaged portion engageable with the second end of the operating spring to restrain movement of the second end of the operating spring when the first rotational member is rotated in one direction so that rotation of the first rotational member is rotated in the one direction causes a reduction in the diameter of the main body of the operating spring so that a portion of the main body frictionally engages the peripheral portion of the second rotational member in a manner causing the first rotational member and the second rotational member to rotate together, wherein the at least one braking member is installed in a collar member and generates radially directed biasing force against an inner peripheral surface of the collar member.

17. A clutch mechanism according to claim 16, wherein the at least one braking member is a C-shaped spring.

18. A clutch mechanism according to claim 16, wherein the at least one braking member comprises first and second C-shaped springs.

19. A clutch mechanism comprising:
a rotatably supported first rotational member having a gear portion engageable with a worm gear of a driving power source to rotatably drive the first rotational member, the first rotational member having an outer periphery;
a rotatably supported second rotational member coaxially positioned with respect to the first rotational member, the second rotational member having an outer periphery;
an operating spring comprising a body portion coaxially arranged 10 with the first and second rotational members and extending around a portion of the outer periphery of the first rotational member and a portion of the outer periphery of the second rotational member, the main body of the operating spring possessing a diameter, the operating spring also possessing first and second ends located adjacent opposite axial ends of the body portion;
at least one restraining spring engageable with a surface of a collar member and having an engaging portion engageable with the second end of the operating spring to restrain movement of the second end of the operating spring when the first rotational member is rotated in one direction so that rotation of the first rotational member in the one direction causes a reduction in the diameter of the main body of the operating spring so that a portion of the main body frictionally engages a portion of the outer periphery of the second rotational member in a manner causing the first rotational member and the second rotational member to rotate together, wherein the at least one restraining spring comprises first and second C-shaped springs; and
linking means for linking the first and second C-shaped springs to restrain relative movement between the first and second C-shaped springs in a circumferential direction.

20. A clutch mechanism according to claim 19, wherein the first rotational member is provided with an upstanding restraining wall portion which restrains movement of the second end of the operating spring upon rotation of the first rotational member in a direction opposite the one direction.

21. A clutch mechanism according to claim 19, wherein the first rotational member comprises a guiding member housing the body portion of the operating spring and an attaching portion at which the first end of the operating spring is attached to the first rotational member, the guiding member comprising a guiding groove extending towards the attaching portion to permit the first end of the operating spring to be moved towards the attaching portion.

* * * * *